United States Patent
Wang et al.

(10) Patent No.: US 10,794,820 B2
(45) Date of Patent: Oct. 6, 2020

(54) METHODS FOR ANALYZING ULTRA-TRACE AMOUNTS OF METALS IN LIQUIDS

(71) Applicants: Ying Wang, Coventry, RI (US); Yuqing Chang, Woburn, MA (US)

(72) Inventors: Ying Wang, Coventry, RI (US); Yuqing Chang, Woburn, MA (US)

(73) Assignees: Ying Wang, Coventry, RI (US); Yuqing Chan, Woburn, MA (US)

( * ) Notice: Subject to any disclaimer, the term of this patent is extended or adjusted under 35 U.S.C. 154(b) by 0 days.

(21) Appl. No.: 16/327,572

(22) PCT Filed: Apr. 10, 2017

(86) PCT No.: PCT/US2017/026822
§ 371 (c)(1),
(2) Date: Feb. 22, 2019

(87) PCT Pub. No.: WO2018/038773
PCT Pub. Date: Mar. 1, 2018

(65) Prior Publication Data
US 2019/0212257 A1 Jul. 11, 2019

Related U.S. Application Data

(60) Provisional application No. 62/378,899, filed on Aug. 24, 2016, provisional application No. 62/448,994, filed on Jan. 21, 2017.

(51) Int. Cl.
*G01J 3/30* (2006.01)
*G01N 21/31* (2006.01)
*G01N 21/73* (2006.01)
*G01N 1/40* (2006.01)

(52) U.S. Cl.
CPC ......... *G01N 21/3103* (2013.01); *G01N 1/405* (2013.01); *G01N 21/73* (2013.01); *G01N 2223/076* (2013.01); *G01N 2223/652* (2013.01)

(58) Field of Classification Search
CPC .... G01N 21/3103; G01N 1/405; G01N 21/73; G01N 2223/076; G01N 2223/652
See application file for complete search history.

(56) References Cited

U.S. PATENT DOCUMENTS

| | | | |
|---|---|---|---|
| 5,618,996 A * | 4/1997 | Wang | G01N 1/2205 73/863.12 |
| 6,012,325 A * | 1/2000 | Ma | G01N 15/0618 378/47 |
| 6,027,543 A | 2/2000 | Yoshizaki et al. | |
| 2004/0005651 A1 | 1/2004 | Aiken et al. | |
| 2005/0009194 A1 | 1/2005 | Franklin et al. | |
| 2011/0263924 A1 * | 10/2011 | Yantasee | G01N 33/54326 600/12 |
| 2015/0355090 A1 | 12/2015 | Boday et al. | |
| 2016/0123910 A1 | 5/2016 | Lee et al. | |

\* cited by examiner

*Primary Examiner* — Abdullahi Nur
(74) *Attorney, Agent, or Firm* — Fox Rothschild LLP

(57) ABSTRACT

The present invention relates to a method of detecting one or more metals in as liquid sample. The method includes the step of extracting the metal from the liquid sample and retaining the metal on a binding material. The detection of the extracted metal can be performed with the metal retained on the binding material or after the elution of the metal off the binding material.

19 Claims, 1 Drawing Sheet

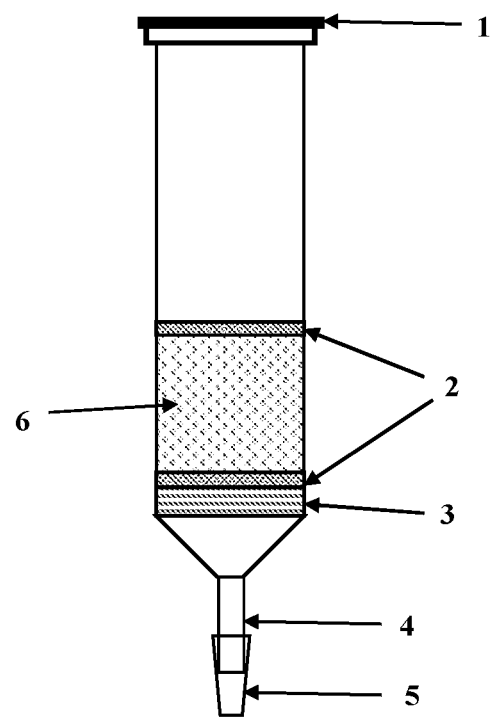

METHODS FOR ANALYZING ULTRA-TRACE AMOUNTS OF METALS IN LIQUIDS

CROSS-REFERENCE TO RELATED APPLICATIONS

This application is a U.S. national phase application of international application No. PCT/US2017/026822, filed on Apr. 10, 2017, which in turn claims the benefit under 35 U.S.C. § 109(e) of U.S. Provisional Application Ser. No. 62/378,899, filed Aug. 24, 2016, and U.S. Provisional Application Ser. No. 62/448,994, filed Jan. 21, 2017, all of which are hereby incorporated by reference in their entireties.

FIELD OF THE INVENTION

The present invention relates to a method of detecting metals in samples collected from pharmaceutical products, water, food and various environmental sources.

BACKGROUND OF THE INVENTION

The ICH Q3D guideline of International Conference on Harmonisation of Technical Requirements for Registration of Pharmaceuticals for Human Use (ICH) requires that elemental impurities be analyzed to meet the concentration specification. The United States Pharmacopoeia (USP) proposed new testing procedure for elemental impurities in pharmaceutical products and their ingredients. Purified water used in the semi-conductor industry requires ultra-trace levels of metals. Further, the level of heavy metals in the drinking water is also regulated by Environmental Protection Agency (EPA).

Currently, the analytical technologies used for determining elemental impurities at ultra-trace level (ppm and ppb) are Inductively Coupled Plasma-Optical Emission Spectrometry (ICP-OES) and ICP-Mass spectrometry (ICP-MS). The major disadvantages of these two technologies are (i) high cost of instruments and instrument maintenance, (ii) tedious and time-consuming sample pre-treatment using microwave digester, and (iii) low recovery due to the sample loss during the sample pre-treatment.

Therefore, a need exists for an effective and cost-efficient method of detecting low-level metals from various sources.

SUMMARY OF THE INVENTION

This invention is made to meet such a need. The method described herein generally includes extracting the metal from a liquid sample. The metal retained at the solid support material can be readily detected with conventional analytical instruments.

The detection method generally includes: (a) passing the liquid sample through a container, which is filled with a binding material capable of extracting the metal from the liquid sample and retaining the metal in the material; and (b) detecting the presence of the extracted metal.

In some embodiments, the binding material containing the extracted metal is directly submitted for analysis. The binding material can be left in the container for direct analysis. The metal can be detected by analytical instrumentation including, but not limited to, X-ray or fluoresce X-ray spectroscopy.

In some embodiments, the extracted metal is eluted off the solid-phase binding material before being submitted for analysis. In some embodiments, the eluting solvent contains an acid. Suitable detection methods include, but are not limited to, Inductively Coupled Plasma-Optical Emission Spectrometry (ICP-OES), Inductively Coupled Plasma-Mass Spectrometry, and Atomic Absorption Spectrometry (AAS) Analysis, Ion Chromatography (IC), Ion Chromatography-Mass Spectrometry (IC-MS).

The method of the present invention can detect the presence of a metal qualitatively or quantitatively. In some embodiments, the identity and/or concentration of the extracted metal is determined based on a comparison with a reference, which corresponds to a particular metal and/or a pre-determined concentration.

In some embodiments, the liquid sample contains less than about 100 ppm (parts per million by weight) of the metal. In some embodiments, the sample contains less than about 1 ppm of the metal. In some embodiments, the sample contains metal(s) at the ppb (parts per billion by weight) level.

In some embodiments, liquid sample contains one or more: independently selected from As, Pb, Cd, Hg, Cr, Pd, Pt, Sb, Be, In, Ir, Rh, Ru, Sr, Os, Tl, and W. In some embodiments, more than about 90% of the metal is extracted and retained on the binding material. In some embodiments, more than about 90% of the metal is extracted from the liquid sample.

The binding material can contain a ligand capable of coordinating to the metal and retaining the metal. In some embodiments, the ligand contains one or more heteroatoms independently selected from the group consisting of phosphine, nitrogen, sulfur, and oxygen. In some embodiments, the binding material contains one or more compounds selected from Mercaptopropyl ethyl sulfide silica (SPM32); 3-Mercaptopropyl ethyl sulfide silica (SPM36f); 2-Mercaptoethyl ethyl sulfide silica (SEM26); 3-Mercaptopropyl ethyl sulfide silica (SPM3); Methyl thiourea ethyl sulfide ethyl silica (MTCf); Triamine ethyl sulfide amide silica (STA3); Pentaamine ethyl sulfide amide silica (SPA5); 2-Aminoethyl sulfide ethyl silica (SEA); 2-Hydroxyethyldiamine ethyl sulfide amide silica (SDEA); Disodium succinate ethyl sulfide silica (STMS); Disodium ethyl/butyl phosphonate silica (PO1); and Ethyl/butyl phosphonic acid silica (POH1).

Various parameters of the liquid sample can be modified to optimize the extraction and detection of the metal. In some embodiments, the liquid sample contains one or more solvent(s) selected from N-Methyl-2-pyrrolidone (NMP), Dimethyl sulfoxide (DMSO), and de-ionized water. In some embodiments, the pH of the sample is between about 2.5 and about 4.5. In some embodiments, the temperature of the sample is between about 20° C. and about 30° C.

The liquid sample can be prepared from a source containing a metal such as a pharmaceutical product, food, a water source, and industry waste.

Other aspects and benefits of the present invention will be better appreciated in view of the drawing, the detailed description, and the claims.

BRIEF DESCRIPTION OF THE DRAWINGS

FIG. 1 illustrates a cartridge packed with a binding material for extracting and retaining a metal.

DETAILED DESCRIPTION OF THE INVENTION

Various embodiments of the invention disclose a method for detecting metals in pharmaceutical products, water, food and various environmental sources. In particular, the method can be applied to the detection of trace or ultra-trace level of metals. The fast and efficient method of the present invention overcomes the drawbacks in conventional approaches and allows for quantitative as well as qualitative detection.

In order to describe the subject matter of the claims more clearly and concisely, the following definitions are intended to provide guidance as to the meaning of terms used herein.

The articles "a" and "an" as used herein mean "one or more" or "at least one," unless otherwise indicated. That is, a reference to any element of the present invention by the indefinite article "a" or "an" does not exclude the possibility that more than one of the element is present.

The term "about" means the referenced numeric indication plus or minus 10% of that referenced numeric indication.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations.

Furthermore, there is no intention to be bound by any expressed or implied theory presented in the preceding technical field, background, brief summary or the following detailed description.

The method described herein generally includes passing a liquid sample through a container that contains a binding material for extracting and retaining the metal from the liquid sample. The container also includes an inlet for injecting the sample and an outlet for releasing the liquid. The extracted metal can be detected in a form either as retained in the material or as further processed or eluted from the material.

In some embodiments, the binding material or the container with the extracted metal retained thereon is directly subject to analysis. For instance, the material retaining the extracted metal can be removed from the container and placed in the analytical instrument for metal detection. Alternatively, the material with the metal retained thereon is kept in the container and the entire container is analyzed to determine the presence and/or the amount of the extracted metal. The analytical instrument utilizes, for example, X-ray or Fluoresce X-ray to detect the metal.

In some embodiments, the extracted metal is eluted from the material on which it attaches before being analyzed. Various agents can be used to remove the metal from the support material. In some embodiment, the metal is washed off the material with an acid. Non-limiting examples of acids include nitric acid and hydrochloric acid. The eluent containing the extracted acid can be further processed or concentrated. For example, the acid can be neutralized and/or the solvent can be removed/replaced with a different solvent before analysis using, e.g., Inductively Coupled Plasma-Optical Emission Spectrometry (ICP-OES), Inductively Coupled Plasma-Mass Spectrometry, and Atomic Absorption Spectrometry (AAS) Analysis, IC and IC-MS.

The analytical instrument can detect a metal based on the presence of the characteristic peak associated with that metal. Further, by comparing the intensity of the detected signal with a reference, the quantity or concentration of a metal can also be determined.

Various types of binding materials are known to capture metals through physical or chemical interactions. For instance, fine carbon powder can retain metals by absorbing the metal to its surface. Some other materials contain cavities with a size suitable for capturing metals. Still some materials exhibit affinities to metals through ionic interaction.

In some embodiments, the material for extracting the metal contains a ligand which through coordination extracts the metal out of the liquid sample. Many inorganic and organic ligands are known to bind to metals. In some embodiments, the ligand contains one or more heteroatoms such as N, P, O, and S. The heteroatoms can be within an aromatic ring or a non-aromatic structure. Examples of the ligand include silica-based materials manufactured by PhosphonicS Ltd., such as ethyl/butyl phosphonic acid silica, ethyl sulfonic acid silica, aryl sulfonic acid silica, and alky sulfonic acid silica, or the like.

In some embodiments, the material for extracting metals contains one or more of the following: Mercaptopropyl ethyl sulfide silica (SPM32); 3-Mercaptopropyl ethyl sulfide silica (SPM36f), 2-Mercaptoethyl ethyl sulfide silica (SEM26); 3-Mercaptopropyl ethyl sulfide silica (SPM3); Methyl thiourea ethyl sulfide ethyl silica (MTCf); Triamine ethyl sulfide amide silica (STA:3); Pentaamine ethyl sulfide amide silica (SPA5); 2-Aminoethyl sulfide ethyl silica (SEA); 2-Hydroxyethyldiamine ethyl sulfide amide silica (SDEA); Disodium succinate ethyl sulfide silica (STMS); Disodium ethyl/butyl phosphonate silica (PO1); and Ethyl/butyl phosphonic acid silica (POH1). The specific components and the ratio thereof in the material can be adjusted depending on factors such as the metals to be detected and the particular analytical instrument. In some embodiments, the material contains 1, 2, 3, 4, 5, or more of the above mentioned silica-based ligands.

The binding material is so prepared that substantially all of the metal in the liquid sample is extracted. In some embodiments, more than about 80%, more than about 85%, more than about 90%, more than about 95%, or more than about 98% of the metal in the liquid sample is extracted and retained on the binding material.

The configuration of the container including the binding material is illustrated in FIG. 1. The packing material shown in FIG. 1 contains one or more of the binding components to extract the metal. While Figure illustrates a column-shaped cartridge, various other types of containers can be used to accommodate the binding material. The solid phase extraction (SPE) cartridge consists of an organic solvent resistant plastic tube usually made with high density polyethylene, a screwed removable (3) solvent outlet tip (4), packed metal extraction material(s) (6), and two frits with 20 μm pores (2). In addition, an unused extraction cartridge is sealed with a plastic cover (1) on the top and a tip cover (5) on the outlet tip (4) to prevent contamination. The size of SPE cartridge varies based on the application and instruments settings. The amount of packing material(s) varies based on the sample size and metal concentrations.

The metal in the liquid sample can be effectively extracted on the binding material. If necessary, the liquid collected from the outlet of the container can be re-introduced onto the material to ensure the maximum capture of the metal.

Because the metal is extracted and retained on the binding material, it can be enriched on the solid support to a level detectable by conventional analytical means. Meanwhile, other components in the liquid sample flow down the material without interfering with the detection and analysis. Based on the volume of the liquid sample, the concentration of the metal in the liquid sample can be quantitatively determined. If the extracted metal is eluted off the material and then analyzed, the newly obtained liquid sample can be further concentrated before being submitted for analysis.

The method of the present invention is amenable to detecting low levels of metals. Non-limiting examples of metals that can be detected include As, Pb, Cd, Hg, Cr, Pd, Pt, Sb, Be, In, Ir, Rh, Ru, Sr, Os, Tl, and W.

In some embodiments, the liquid sample contains a metal of less than about 100 ppm, less than about 50 ppm, less than about 10 ppm, less than about 5 ppm, less than about 1 ppm, less than about 100 ppb, less than about 50 ppb, less than about 10 ppb, or less than about 5 ppb. Because the metal is retained on the binding material, the metal can be enriched thereon and reach a concentration detectable with conventional analytical means.

The liquid sample can be prepared with any suitable solvent to assist with the extraction and elution process. Preferably, the solvent dissolves all non-metal components or interfering compounds so that they can be quickly washed down the material while only the metal is retained due to its affinity to the material. Non-limiting examples of the solvent include N-methyl-2-pyrrolidone (NMP), dimethyl sulfoxide (DMSO), tetrahydrofuran (THF), acetonitrile, de-ionized water, or combinations thereof.

Other parameters of the liquid sample can be modified to optimize the extraction of the metal, In some embodiments, the pH of the liquid sample is controlled at a range of between about 1 to about 6, between about 2 to about 5, between about 2.5 to about 4.5, between about 3.5 to about 4.5, between about 3 to about 4, between about 4 to about 5, between about 5 to about 6, between about 7 to about 8, between about 8 to about 9, or between about 9 to about 10.

The temperature of the sample can be in the range of 5° C. and about 50° C., sometimes preferably between about 10° C. and about 40° C., sometimes preferably between about 15° C. and about 30° C., and sometimes preferably between about 20° C. and about 25° C., which can also be adjusted to between about 15° C. and about 20° C., between about 20° C. and about 30° C., or between about 30° C. and about 40° C., or the like as needed.

It should be understood from the foregoing that, while particular embodiments have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein, which depend upon a variety of conditions and variables. Various modifications in form and detail of the embodiments of the invention will be apparent to a person skilled in the art. It is therefore contemplated that the invention shall also cover any such modifications, variations, and equivalents.

What is claimed is:

1. A method of detecting a metal in a liquid sample, comprising
    (a) passing the liquid sample through a container, said container filled with a binding material comprising a ligand capable of extracting the metal from the liquid sample and retaining the metal in the material; and
    (b) detecting the extracted metal with an analytical instrument.

2. The method of claim 1, wherein the extracted metal in step (b) is retained in the binding material when being detected.

3. The method of claim 2, wherein the material is kept in the cartridge when the extracted metal is being detected.

4. The method of claim 2, wherein the extracted metal is detected via an X-Ray spectrometer.

5. The method of claim 1, wherein the extracted metal in Step (b) is eluted off the binding material before being detected.

6. The method of claim 5, wherein the extracted metal is eluted off the binding material with an acid.

7. The method of claim 5, wherein the extracted metal is detected via an analytical method selected from the group consisting of Inductively Coupled Plasma-Optical Emission Spectrometry (ICP-OES), Inductively Coupled Plasma-Mass Spectrometry, Atomic Absorption Spectrometry (AAS) Analysis, Ion Chromatography (IC), and Ion Chromatography-Mass Spectrometry (IC-MS).

8. The method of claim 1, wherein the identity and/or concentration of the extracted metal is determined based on a comparison with a reference.

9. The method of claim 1, wherein the liquid sample contains the metal by less than 10 ppm.

10. The method of claim 1, wherein the liquid sample contains the metal by less than 1 ppm.

11. The method of claim 1, wherein the metal is selected from the group consisting of As, Pb, Cd, Fig, Cr, Pd, Pt, Sb, Be, In, Ir, Rh, Ru, Sr, Os, Tl, W, and combinations thereof.

12. The method of claim 1, wherein more than about 90% of the metal in the liquid sample is extracted and retained on the binding material.

13. The method of claim 1, wherein more than about 98% of the metal in the liquid sample is extracted and retained on the binding material.

14. The method of claim 1, wherein the ligand comprises one or more heteroatoms selected from the group consisting of phosphine, nitrogen, sulfur, and oxygen.

15. The method of claim 1, wherein the material comprises one or more compounds selected from the group consisting of Mercaptopropyl ethyl sulfide silica (SPM32); 3-Mercaptopropyl ethyl sulfide silica (SPM36f); 2-Mercaptoethyl ethyl sulfide silica (SEM26); 3-Mercaptopropyl ethyl sulfide silica (SPM3); Methyl thiourea ethyl sulfide ethyl silica (MTCf); Triamine ethyl sulfide amide silica (STA3); Pentaamine ethyl sulfide amide silica (SPAS); 2-Aminoethyl sulfide ethyl silica (SEA); 2-Hydroxyethyl-diamine ethyl sulfide amide silica (SDEA); Disodium succinate ethyl sulfide silica (STMS); Disodium ethyl/butyl phosphonate silica (PO1); and Ethyl/butyl phosphonic acid silica (POH1).

16. The method of claim 1, wherein the liquid sample comprises a solvent selected from the group consisting of N-methyl-2-pyrrolidone (NMP), dimethyl sulfoxide (DMSO), tetrahydrofuran (THF), acetonitrile, de-ionized water, and combinations thereof.

17. The method of claim 1, wherein pH of the liquid sample ranges between about 2.5 to about 4.5.

18. The method of claim 1, wherein the temperature of the liquid sample ranges between about 5° C. and about 50° C., between about 10° C. and about 40° C., and between about 15° C. and about 30° C., and between about 20° C. and about 25° C.

19. The method of claim 1, wherein the liquid sample is prepared from a source selected from the group consisting of a pharmaceutical products, foods, water sources, industrial wastes, and combinations thereof.

* * * * *